United States Patent
Forkosh

(10) Patent No.: US 8,943,844 B2
(45) Date of Patent: Feb. 3, 2015

(54) DESICCANT-BASED AIR CONDITIONING SYSTEM

(75) Inventor: Dan Forkosh, Aventura, FL (US)

(73) Assignee: DuCool Ltd., Hof Hacarmel (IL)

( * ) Notice: Subject to any disclaimer, the term of this patent is extended or adjusted under 35 U.S.C. 154(b) by 0 days.

(21) Appl. No.: 13/384,007

(22) PCT Filed: Nov. 23, 2010

(86) PCT No.: PCT/US2010/057840
§ 371 (c)(1),
(2), (4) Date: Jan. 13, 2012

(87) PCT Pub. No.: WO2012/071036
PCT Pub. Date: May 31, 2012

(65) Prior Publication Data
US 2013/0227982 A1 Sep. 5, 2013

(51) Int. Cl.
*F25D 17/06* (2006.01)
*F25D 23/00* (2006.01)
(Continued)

(52) U.S. Cl.
CPC ............ *F24F 3/1417* (2013.01); *B01D 53/263* (2013.01); *B01D 53/1425* (2013.01); *B01D 2252/2025* (2013.01); *F24F 5/001* (2013.01); *F24F 2003/1458* (2013.01);
(Continued)

(58) Field of Classification Search
CPC ....... F24F 3/1417; F24F 3/1429; F24F 3/147; F24F 2003/144; F24F 2003/1458; F24F 5/001; F24F 2203/021; F25B 27/02; F25B 30/06; B01D 53/263; B01D 53/1425

USPC ................. 62/91–92, 94, 271, 476–477, 143, 62/304–305, 310
See application file for complete search history.

(56) References Cited

U.S. PATENT DOCUMENTS

| 2,672,024 A | 3/1954 | McGrath |
| 2,798,570 A | 7/1957 | Kelley |

(Continued)

FOREIGN PATENT DOCUMENTS

| EP | 1510768 A1 | 3/2005 |
| FR | 2574908 A1 | 6/1986 |

(Continued)

OTHER PUBLICATIONS

Ronald V. Wahlgren; Atmospheric Water Vapour Processor Designs for Potable Water Production: A review; Wat. Res. vol. 35, No. 1, pp. 1-22, 2001.

*Primary Examiner* — Cassey D Bauer
*Assistant Examiner* — Joseph Trpisovsky

(57) ABSTRACT

An air conditioning system includes a dehumidifier, a regenerator, and a refrigeration system. The dehumidifier removes water from a first airflow using a liquid desiccant. The regenerator transfers water from the dilute desiccant into a second airflow. The refrigeration system can be selectively used to provide heat to the desiccant in the regenerator to more effectively remove the water from the dilute desiccant. An external heat source can also be used to heat the desiccant in the regenerator to more effectively remove the water from the dilute desiccant. The refrigeration system and the external heat source can each be used separately to heat the desiccant, or the desiccant can be heated by both heat sources simultaneously.

20 Claims, 3 Drawing Sheets

(51) Int. Cl.
*F25B 17/00* (2006.01)
*F28D 5/00* (2006.01)
*B01D 53/26* (2006.01)
*F24F 5/00* (2006.01)
*B01D 53/14* (2006.01)
*F24F 3/14* (2006.01)

(52) U.S. Cl.
CPC .... *F24F 2203/021* (2013.01); *B01D 2252/504* (2013.01); *F24F 2003/144* (2013.01); *F24F 3/1429* (2013.01)
USPC ............ 62/94; 62/91; 62/92; 62/271; 62/476; 62/477; 62/143; 62/304; 62/305; 62/310

(56) References Cited

U.S. PATENT DOCUMENTS

| | | | |
|---|---|---|---|
| 2,935,154 A | 5/1960 | Kelley | |
| 3,018,231 A | 1/1962 | Valentine et al. | |
| 3,266,784 A | 8/1966 | Saito | |
| 4,134,743 A | 1/1979 | Macriss et al. | |
| 4,171,624 A | 10/1979 | Meckler et al. | |
| 4,180,985 A | 1/1980 | Northrup, Jr. | |
| 4,197,713 A | 4/1980 | Bulang | |
| 4,222,244 A * | 9/1980 | Meckler | 62/235.1 |
| 4,259,849 A | 4/1981 | Griffiths | |
| 4,299,599 A | 11/1981 | Takeyama et al. | |
| 4,312,640 A | 1/1982 | Verrando | |
| 4,313,312 A | 2/1982 | Ito et al. | |
| 4,365,979 A | 12/1982 | Takeyama et al. | |
| 4,398,927 A | 8/1983 | Asher et al. | |
| 4,527,398 A | 7/1985 | Schaetzle | |
| 4,577,471 A * | 3/1986 | Meckler | 62/271 |
| 4,783,432 A | 11/1988 | Settlemyer | |
| 4,832,711 A | 5/1989 | Christel, Jr. et al. | |
| 4,860,548 A | 8/1989 | Ryham | |
| 4,903,503 A * | 2/1990 | Meckler | 62/238.3 |
| 4,939,906 A | 7/1990 | Spatz et al. | |
| 4,941,324 A | 7/1990 | Peterson et al. | |
| 4,955,205 A | 9/1990 | Wilkinson | |
| 4,984,434 A * | 1/1991 | Peterson et al. | 62/94 |
| 5,020,335 A | 6/1991 | Albers et al. | |
| 5,097,668 A | 3/1992 | Albers et al. | |
| 5,191,771 A | 3/1993 | Meckler | |
| 5,233,843 A | 8/1993 | Clarke | |
| 5,448,895 A | 9/1995 | Coellner et al. | |
| 5,669,221 A | 9/1997 | LeBleu et al. | |
| 5,699,673 A | 12/1997 | Hoshino et al. | |
| 5,817,167 A | 10/1998 | DesChamps | |
| 5,845,504 A | 12/1998 | LeBleu | |
| 5,857,344 A | 1/1999 | Rosenthal | |
| 5,953,926 A | 9/1999 | Dressler et al. | |
| 6,018,954 A | 2/2000 | Assaf | |
| 6,058,718 A | 5/2000 | Forsberg et al. | |
| 6,134,903 A | 10/2000 | Potnis et al. | |
| 6,182,453 B1 | 2/2001 | Forsberg | |
| 6,199,389 B1 | 3/2001 | Maeda | |
| 6,226,888 B1 | 5/2001 | Lang | |
| 6,230,503 B1 | 5/2001 | Spletzer | |
| 6,251,172 B1 | 6/2001 | Conrad | |
| 6,336,957 B1 | 1/2002 | Tsymerman | |
| 6,453,684 B1 | 9/2002 | Spletzer et al. | |
| 6,463,750 B2 | 10/2002 | Assaf | |
| 6,481,222 B1 | 11/2002 | Denniston | |
| 6,487,872 B1 | 12/2002 | Forkosh et al. | |
| 6,494,053 B1 | 12/2002 | Forkosh et al. | |
| 6,511,525 B2 | 1/2003 | Spletzer et al. | |
| 6,514,321 B1 | 2/2003 | Lehto et al. | |
| 6,546,746 B2 | 4/2003 | Forkosh et al. | |
| 6,821,443 B2 | 11/2004 | Kim | |
| 6,863,711 B2 | 3/2005 | Tongue et al. | |
| 6,869,464 B2 | 3/2005 | Klemic | |
| 6,976,365 B2 | 12/2005 | Forkosh et al. | |
| 7,043,934 B2 | 5/2006 | Radermacher et al. | |
| 7,269,966 B2 | 9/2007 | Lowenstein et al. | |
| 7,306,650 B2 | 12/2007 | Slayzak et al. | |
| 7,430,878 B2 | 10/2008 | Assaf | |
| 7,942,387 B2 | 5/2011 | Forkosh | |
| 8,490,427 B2 * | 7/2013 | Erickson | 62/271 |
| 2001/0015072 A1 | 8/2001 | Assaf | |
| 2001/0015077 A1 | 8/2001 | Potnis et al. | |
| 2002/0116935 A1 | 8/2002 | Forkosh et al. | |
| 2003/0014983 A1 | 1/2003 | Maisotsenko et al. | |
| 2003/0221438 A1 | 12/2003 | Rane et al. | |
| 2004/0112077 A1* | 6/2004 | Forkosh et al. | 62/271 |
| 2004/0168462 A1 | 9/2004 | Assaf | |
| 2004/0194478 A1 | 10/2004 | Maeda et al. | |
| 2004/0211207 A1 | 10/2004 | Forkosh et al. | |
| 2004/0231512 A1 | 11/2004 | Slayzak et al. | |
| 2004/0261440 A1 | 12/2004 | Forkosh et al. | |
| 2005/0109052 A1 | 5/2005 | Albers et al. | |
| 2005/0236145 A1 | 10/2005 | Arai et al. | |
| 2006/0130654 A1 | 6/2006 | King et al. | |
| 2007/0101862 A1 | 5/2007 | Tongue | |
| 2009/0211276 A1 | 8/2009 | Forkosh | |

FOREIGN PATENT DOCUMENTS

| | | |
|---|---|---|
| JP | 2005214595 A | 8/2005 |
| WO | 9633378 A1 | 10/1996 |
| WO | 9926026 A1 | 5/1999 |
| WO | 0055546 A1 | 9/2000 |
| WO | 02066901 A1 | 8/2002 |
| WO | 02086391 A1 | 10/2002 |
| WO | 03056249 A1 | 7/2003 |
| WO | 2004046618 A1 | 6/2004 |
| WO | 2005057114 A1 | 6/2005 |
| WO | 2006026494 A1 | 3/2006 |
| WO | 2006129200 A2 | 12/2006 |

* cited by examiner

DESICCANT-BASED AIR CONDITIONING SYSTEM

TECHNICAL FIELD

The present invention relates to a system for conditioning air.

BACKGROUND

Liquid desiccant air conditioning systems can provide an effective means to cool, dehumidify, and otherwise condition ambient air. Examples of such systems are described in the following international patent applications: WO 99/26026, WO 00/55546, and WO 03/056249.

One thing that is common to most desiccant-based air conditioning systems is the need to provide heating or cooling to control the temperatures of a fluids within the system—e.g., the desiccant on the dehumidification side, the desiccant on the regeneration side, and the airflows on either or both of these sides. Although the source of heating or cooling may come from any of a number of different sources, it would be advantageous to have a desiccant-based air conditioning system that could control the temperature of the desiccant by heat transfer to or from multiple sources, where each source could be used individually or together based on system needs and the availability of the sources.

SUMMARY

Embodiments of the invention include a system for conditioning air, where the temperature of a liquid desiccant is controlled using more than one or heat or cooling source in such a way that each of the sources can be used individually or combined depending on certain criteria.

In some embodiments, a heating capacity of an external heat source is evaluated. As used herein, the term "heating capacity" is a generic term that generally refers to an amount of heat available from the heat source. For example, if a water reservoir is heated by a solar energy source, and the volume of water in the reservoir is generally known, one measurement of the "heating capacity" would be to measure the temperature of the known volume of water. This would provide an indication of how much heat might be available from the heat source. In addition to a measurement of temperature for a known volume of material, the "heating capacity" may also be determined by any other method effective to convey an amount of heat available for use in the desiccant air conditioning system. For example, the type of material and its thermal conductivity may be taken into account to determine the heating capacity of the material, or other parameters may be used.

Once the heating capacity of the heat source is determined, and assuming for example that the desiccant on the regeneration side of the air conditioning system requires the addition of heat, it can then be determined whether the heating capacity is above a first predetermined amount. If, for example, the heating capacity is too low—i.e., it is below the first predetermined amount—heat transfer from the external heat source to the desiccant can be prohibited because such transfer would be inefficient, or in an extreme case, the desiccant may actually transfer heat back to the external heat source. If, however, the heating capacity is determined to be above the first predetermined amount, it may then be desirable to determine whether it is above a second predetermined amount.

If the heating capacity is determined to be above the second predetermined amount, which is higher than the first predetermined amount, then heat may be transferred exclusively from the external heat source to the desiccant, that is, heat is not transferred to the desiccant from any other heat source. Another type of heat source that may be used is the heat that is given off in a vapor-compression refrigeration cycle. In the example mentioned above, where the heating capacity of the external heat source is determined to be above the second predetermined amount, heat transfer from the refrigeration system to the desiccant may be prohibited. Conversely, if the heating capacity of the external source is determined to be above the first predetermined amount but below the second predetermined amount, it may be indicative that the external heat source has the capacity to provide some heat to the desiccant, but not all of the heat required. In such a case, heat may be transferred to the desiccant from both the external heat source and the other heat source, such as the refrigeration system.

Embodiments of the invention include a system for conditioning air that has a dehumidifier into which a first airflow is introduced and contacted with a liquid desiccant to transfer water from the first airflow to the liquid desiccant. A second airflow is introduced into a regenerator and contacted with liquid desiccant to transfer water from the liquid desiccant to the second airflow. The air conditioning system also includes a refrigeration system that has a plurality of heat exchangers, a refrigerant, and a compressor. Also included is a regeneration desiccant heat exchanger that is configured to selectively receive heat from the refrigeration system and selectively receive heat from an external heat source. The regeneration desiccant heat exchanger is also configured to receive the liquid desiccant from the regenerator to transfer heat from at least one of the refrigeration system or the external heat source to the liquid desiccant prior to the second airflow contacting the liquid desiccant.

In some embodiments, a first heat exchanger of the refrigeration system is configured to receive a heat transfer fluid, such as glycol, water and glycol, water, or any other fluid effective to transfer heat to the desiccant. The glycol receives heat from the refrigerant, and is selectively in contact with the regeneration desiccant heat exchanger for transferring heat to the liquid desiccant. A second heat transfer fluid is configured to receive heat from the external heat source, and selectively contact the regeneration desiccant heat exchanger to transfer heat to the liquid desiccant. The second heat transfer fluid may be, for example, hot water from a water reservoir heated by solar energy. Alternatively, the second heat transfer fluid could be glycol or a combination of glycol and water, or any other fluid effective to transfer heat from the external heat source to the regeneration desiccant heat exchanger. The external heat source, as noted above, can be solar energy; however, it may also be any other heat source effective to provide heat to the liquid desiccant. For example, the external heat source can be waste heat from an engine or other heat producing system, it can be geothermal energy, or heat from a cogeneration (CHP) system, just to name a few.

As discussed below, some embodiments of the present invention have the first and second heat transfer fluids enter the regeneration desiccant heat exchanger through a common inlet, such that they combine prior to entering the heat exchanger. In such cases, the first and second heat transfer fluids will have the same constituent materials, and may, for example, split their respective flows after leaving the heat exchanger, such that a portion goes back through the first refrigeration system heat exchanger, and another portion goes back to the external heat source.

Embodiments of the invention also include a second refrigeration system heat exchanger that is configured to receive a first coolant from an external cooling source, and to transfer heat from the refrigerant to the first coolant. This second refrigeration heat exchanger may be conveniently located upstream of the cool side of the refrigeration system, such that the very hot refrigerant receives a pre-cooling prior to entering an evaporator.

Some embodiments of the invention include an air conditioning system that includes a refrigeration system having a plurality of heat exchangers, a refrigerant, and a compressor. A dehumidifier receives a first airflow, where it contacts a liquid desiccant to transfer water from the first airflow to the liquid desiccant. A regenerator receives a second airflow where it contacts a liquid desiccant to transfer water from the liquid desiccant to the second airflow. The regenerator includes a first heat transfer loop for selectively transferring heat from the refrigeration system to the liquid desiccant prior to the second airflow contacting the liquid desiccant. It also includes a second heat transfer loop that selectively transfers heat from an external heat source to the liquid desiccant prior to the second airflow contacting the liquid desiccant.

The first heat transfer loop may include a regeneration desiccant heat exchanger configured to receive the liquid desiccant from the regenerator. It can also include a first of the refrigeration system heat exchangers that is configured to receive the refrigerant, and a first heat transfer fluid configured to selectively contact the first refrigeration system heat exchanger to receive heat from the refrigerant and to selectively contact the regeneration desiccant heat exchanger to transfer heat from the first heat transfer fluid to the liquid desiccant. The second heat transfer loop may include the regeneration desiccant heat exchanger, the external heat source, and a second heat transfer fluid configured to receive heat from the external heat source and to selectively contact the regeneration desiccant heat exchanger to transfer heat from the second heat transfer fluid to the liquid desiccant. The first and second heat transfer loops may be selectively combinable on an inlet side of the regeneration desiccant heat exchanger.

Embodiments of the invention also include a system for conditioning air that includes a dehumidifier into which a first airflow is introduced and contacted with a liquid desiccant to transfer water from the first airflow to the liquid desiccant. A second airflow is introduced into a regenerator and contacted with the liquid desiccant to transfer water from the liquid desiccant to the second airflow. A refrigeration system includes a plurality of heat exchangers, a refrigerant, and a compressor. A dehumidifier desiccant heat exchanger is configured to selectively transfer heat from the desiccant in the dehumidifier to the refrigeration system prior to the first airflow contacting the liquid desiccant. The dehumidifier desiccant heat exchanger is also configured to selectively transfer heat from the desiccant in the dehumidifier to an external cooling source prior to the first airflow contacting the liquid desiccant.

DETAILED DESCRIPTION

Figure 1:
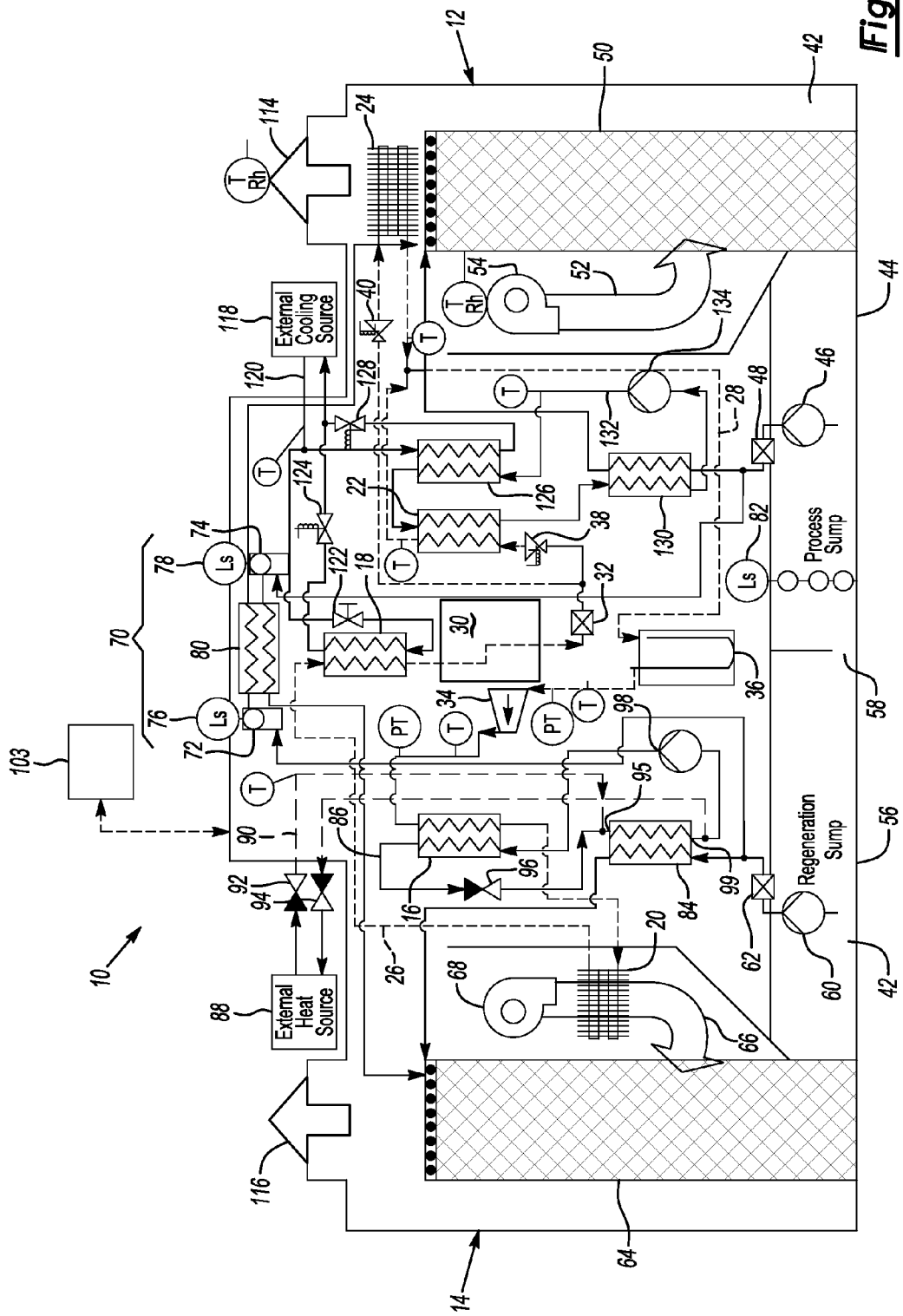
FIG. 1 is a schematic illustration of an air conditioning system in accordance with embodiments of the present invention.

FIG. 1 shows an air conditioning system 10 in accordance with an embodiment of the present invention. In particular, the system 10 is configured to condition air—e.g., control the temperature and/or humidity of the air. In a broad sense, the air conditioning system 10 is broken down into two sections: a process side, or dehumidifier 12, and a regenerator 14. The air conditioning system 10 also includes a refrigeration system that is best described by its component parts. For example, the refrigeration system illustrated in FIG. 1 includes heat exchangers 16, 18, 20, 22 and 24. The refrigeration system also includes a refrigerant, illustrated by the dashed line 26 on the hot side and by the dashed line 28 on the cold side of the refrigeration system. The refrigeration system also includes a receiver 30, a filter 32, a compressor 34, an accumulator 36 and electric expansion valves 38, 40.

Although the air conditioning system 10 uses a vapor compression refrigeration system, the primary mechanism by which it conditions the air is through the use of a liquid desiccant 42. In general, the desiccant 42 is pumped from a dehumidifier sump 44 by pump 46 through a filter 48 to the top of a matrix material 50. The matrix 50 can be a sponge or other medium or media effective to facilitate contact between the desiccant 42 and a first airflow 52. The airflow 52 is blown by a first blower 54, which blows the first airflow 52 across the matrix 50 where water is absorbed from the first airflow 52 by the desiccant 42. As the desiccant 42 flows downward through the matrix 50, it becomes increasingly dilute, as it captures water from the airflow 52. Without further processing, the desiccant 42 would become so dilute as to be ineffective at removing further water from the airflow 52. Therefore, in the embodiment shown in FIG. 1, the dehumidifier sump 44 is connected to a regeneration sump 56 through an opening 58.

In the regenerator 14, the desiccant 42 is pumped by a pump 60 through a filter 62 to the top of matrix material 64 where it flows downward to contact a second airflow 66, which is blown across the matrix 64 by a blower 68. As the desiccant 42 flows through the matrix material 64, it transfers water to the airflow 66 such that it becomes increasingly concentrated as it flows downward toward the regeneration sump 56. The desiccant 42 may be transferred between the sumps 44, 56 through the opening 58 by diffusion based on the concentration gradient between the desiccant in the dehumidifier 12 and the desiccant in the regenerator 14. In addition, the desiccant 42 may be transferred between the dehumidifier 12 and the regenerator 14 through a float system 70 that includes two floats 72, 74, each of which has its own level switch 76, 78.

As shown in FIG. 1, desiccant 42 pumped by the dehumidifier pump 46 is split between the matrix 50 and the float 74. Similarly, the desiccant 42 that is pumped by the regeneration pump 60 is split between the matrix 64 and the float 72. Upon reaching a certain level within the float 72, 74 the desiccant 42 is released to the opposite side of the air conditioning system 10 from which it came. As it is released, it travels through a heat exchanger 80 wherein heat is transferred from the warmer desiccant 42 on the regeneration side, to the cooler desiccant 42 from the dehumidifier side. A level switch 82 disposed in the dehumidifier sump 44 is also used to determine when the pump 46 should be activated to pump the desiccant 42 out of the dehumidifier sump 44.

Liquid desiccants used in the present invention may be polycols, used alone or in mixture. Typical polycols include liquid compounds such as ethylene glycol, propylene glycol, butylene glycol, pentylene glycol, glycerol, trimethyol propane, diethylene glycol, triethylene glycol, tetraethylene glycol, dipropylene glycol, tripropylene glycol, tetrapropylene glycol, and mixtures thereof. Polyol compounds which are normally solid, but which are substantially soluble in anhydrous liquid polyols or liquid hydroxyl amines, may also be used. Typical of these solid polyol compounds are erythritol, sorbitol, pentaerythritol and low molecular weight sugars. Typical hydroxyl amines include alkanolamines, such as monoethanol amine, diethanol amine, triethanol amine, isopropanol amine, including mono, di, and tri, isopropanol amine or digylcolamine.

Still other types of desiccants such as montmorillonite clay, silica gel, molecular sieves, CaO, CaSO4 can all be used. As would be evident to persons of ordinary skill in the art, the selection of a desirable desiccant depends, among other parameters, upon the temperature and humidity ranges of ambient air from which moisture is to be absorbed. Still other exemplary desiccants comprise materials such as P2O5, BaO, Al2O3, NaOH sticks, KOH fused, CaBr2, ZnCl2, Ba(ClO4)2, ZnBr2. The desiccant 42 shown in FIG. 1 may advantageously comprise an aqueous solution of approximately 40% lithium chloride.

To increase the efficiency of the air conditioning system 10, the desiccant 42 on the dehumidifier side 12 may be selectively cooled, while the desiccant 42 on the regenerator side 14 may be selectively heated. On the regeneration side 14 is a regeneration desiccant heat exchanger 84. The heat exchanger 84 is configured to selectively receive heat from the refrigeration system, for example, through a first heat transfer fluid 86 that receives heat from the refrigerant 26 in a first of the refrigeration system heat exchangers 16. As discussed above, the heat transfer fluid 86 can be a liquid, such as a mixture of glycol and water, or any medium effective to transfer heat. The heat exchanger 84 is also configured to selectively receive heat from an external heat source 88, such as a liquid reservoir heated by solar energy, a geothermal heat source, etc.

A second heat transfer fluid indicated by the long dashed line 90 can flow directly to an inlet 95 of the heat exchanger 84. In particular, valves 92, 94 can control the flow of the heat transfer fluid 90 to and from the heat exchanger 84. Similarly, a valve 96 can control the flow of the heat transfer fluid 86 to and from the heat exchangers 16, 84. A pump 98 is used to pump the heat transfer fluid 86 through the refrigeration heat exchanger 16 and the regeneration desiccant heat exchanger 84. Another pump or pumps (not shown) can be used to pump the heat transfer fluid 90 to and from the external heat source 88 and through the inlet 95 and outlet 99 of heat exchanger 84.

As shown in FIG. 1, the flow of the first heat transfer fluid 86 defines a first heat transfer loop that includes the heat exchangers 16, 84. Similarly, the heat transfer fluid 90 defines a second heat transfer loop that includes the heat exchanger 84 and the external heat source 88. By having two different heat sources that can directly transfer heat to the desiccant 42, the air conditioning system 10 may provide greater efficiencies over systems that use a single heat source to heat the desiccant. Each of the heat transfer fluids 86, 90 can enter the heat exchanger 84 through a common inlet 95, and therefore, may have the same constituent materials—e.g., water, glycol, etc.

Figure 2:
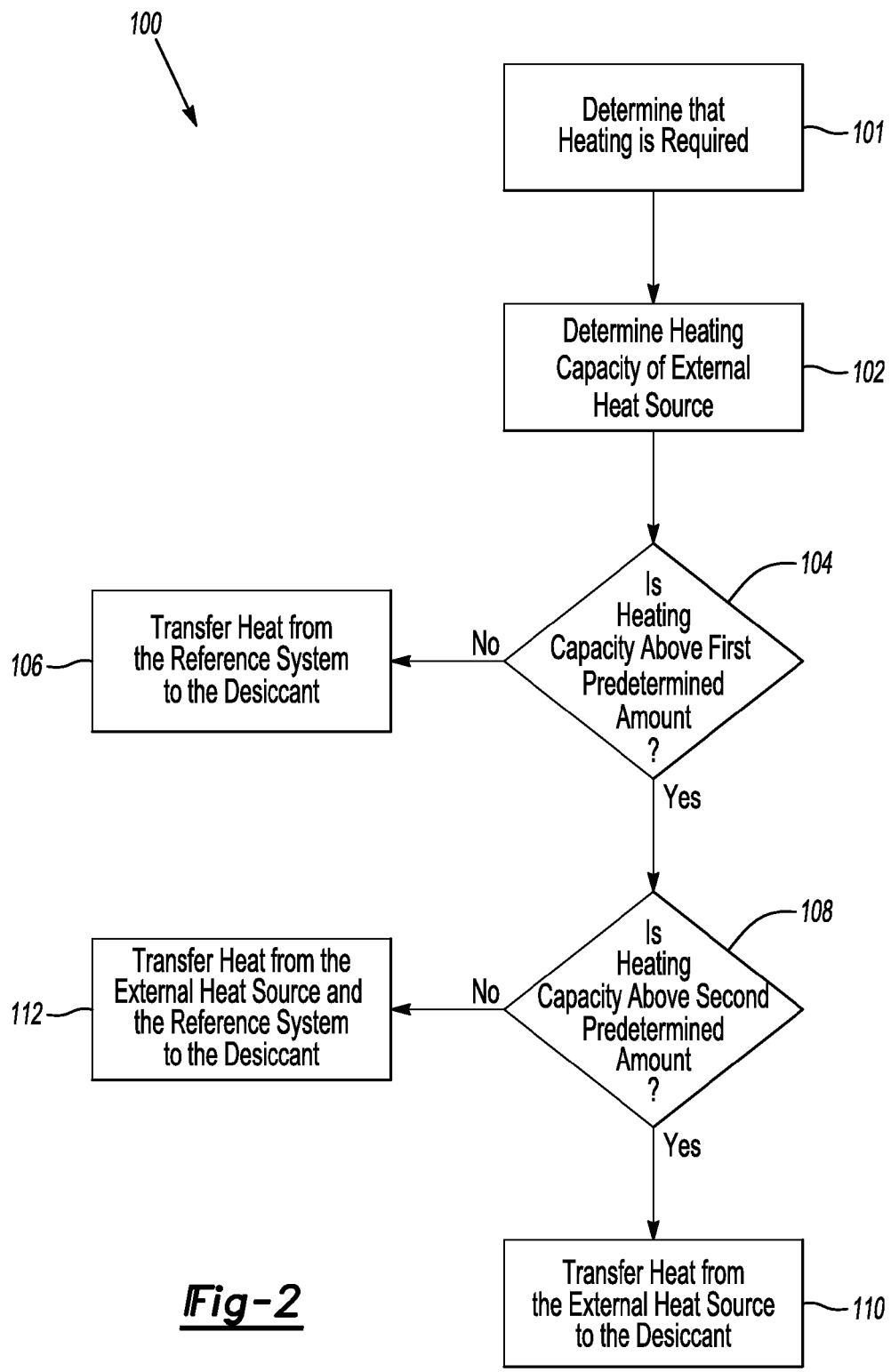
FIG. 2 is a high-level flow chart illustrating embodiments of a control strategy for controlling the air conditioning system shown in FIG. 1.

Turning to FIG. 2, a flow chart 100 is shown, which illustrates a control system for controlling the heat supplied to the desiccant 42 on the regeneration side 14 as illustrated in FIG. 1. At the first step 101, it is determined that heating is required. This may be determined, for example, by measuring the conditions of the supply air or the return air to determine that increased dehumidification is required. Once this determination is made, the method moves to step 102, where the heating capacity of the external heat source 88 is determined. As discussed above, there may be any number of ways to determine the heating capacity of the external heat source 88, such as determining a temperature and volume of a reservoir of liquid. In general, a control strategy is then implemented to determine whether to transfer heat from the external source 88 to the desiccant 42 in the regenerator 14, and if so, whether some or all of the heat will come from the external source 88.

If it is determined that its heating capacity is great enough, at least some of the heat transferred to the desiccant 42 in the regenerator 14 will come from the external heat source 88. A high-level diagram of such a control system is illustrated in the flow chart 100. Such a control system may reside in one or more hardware controllers, software controllers, or a combination of hardware and software controllers. The control system can receive inputs from various sensors as described below, and can control various elements of the system 10, such as pumps and valves, to achieve the desired control strategy. Such a control system 103 is illustrated schematically in FIG. 1.

Returning to FIG. 2, a determination is made at decision block 104 as to whether the heating capacity determined at step 102 is above a first predetermined amount. If it is not, heat is transferred from the refrigeration system, for example, by opening valve 96—see step 106. In addition, heat transfer from the external source 88 to the desiccant 42 may be prohibited, for example, by closing the valves 92, 94 to shut off the flow of the heat transfer fluid 90 to and from the heat exchanger 84.

If it is found that the heating capacity of the external heat source 88 is above the first predetermined amount, then at least some of the heat transferred to the desiccant 42 in the heat exchanger 84 may come from the external heat source 88. Whether only a portion of the heat transferred to the desiccant 42 comes from the external heat source 88, or whether all of it is from the external heat source 88 depends on how far above the first predetermined amount the heating capacity of the external heat source 88 is. For example, it is determined at decision block 108 whether the heating capacity of the external heat source 88 is above a second predetermined amount, which is above the first predetermined amount. If the answer is "yes", then all of the heat to be transferred to the desiccant 42 in the heat exchanger 84 will come from the external heat source 88, and transfer of heat from the refrigeration system through heat exchanger 16, is prohibited. This may be accomplished by shutting off the pump 98 and closing the valve 96—see step 110.

If the heating capacity of the external heat source 88 is between the first and second predetermined amounts, then heat will be transferred to the desiccant 42 in the heat exchanger 84 from both the external heat source 88, and the refrigeration system—see step 112. In at least some embodiments of the invention, the external heat source 88 will be used to the full extent of its capacity to provide as much heat as possible; the refrigeration system will be used to provide only that portion of heat not available from the external heat source 88. This reduces the reliance on the refrigeration system, which will generally result in less energy being used and a lower cost of operation. Stated another way, the flow of the heat transfer fluid 90 is controlled to provide a maximum amount of heat from the external heat source 88, and the flow of the heat transfer fluid 86 is controlled to provide a minimum amount of heat from the refrigeration system.

The actual values of the first and second predetermined amounts used to evaluate how heat will be transferred to the desiccant 42 may depend on a number of factors, including the temperature of the desiccant 42, and the state of the conditioned air 114 as it leaves the dehumidifier 12. In order to effectively control the temperature and humidity of the conditioned air 114, the air conditioning system 10 relies on a number of different sensors configured to measure certain system parameters. For example, temperature sensors designated "T", pressure sensors designated "PT", and temperature/relative humidity sensors designated "T,Rh" are shown in various locations throughout the system 10. These sensors measure the relevant parameter, and then transmit signals to a control system which, for example, can implement various control methods, such as the method illustrated in the flow chart 100 in FIG. 2.

As discussed above, the heat exchanger 84 can receive hot fluid from one or both of the refrigeration system and the external heat source 88. The valves 92, 94, 96 are used to control the flow of the heat transfer fluids 86, 90, and such control may be as described above with regard to the method illustrated in FIG. 2. To provide additional efficiencies in the air conditioning system 10, the refrigerant 26 can be routed through the heat exchanger 20, which is configured to heat the airflow 66 prior to its contacting the desiccant 42 in the matrix 64. In this way, the airflow 66 can absorb more of the water from the desiccant 42 in the regenerator to increase the concentration of the desiccant 42 in the regeneration sump 56. Thus, the airflow 116 is warm and water-laden. To the extent that the air conditioning system 10 is used to condition the air for a living space, such that control of the temperature and humidity of the airflow 114 is the ultimate goal, the airflow 116 may be waste air. Conversely, if the air conditioning system 10 is utilized in a water capture and treatment application, the airflow 114 may be the waste air, while the airflow 116 is cooled or otherwise treated to remove the water for drinking or other applications.

Just as the regenerator 14 can utilize an external heat source, such as the heat source 88, the dehumidifier 12 can utilize an external cooling source 118. The external cooling source 118 may be, for example, a source of cool water from a ground well, surface water, or a cooling tower, just to name a few. As shown in FIG. 1, a coolant 120, which may be water, glycol, a mixture of the two, or some other fluid, flows through one of the refrigeration system heat exchangers 18, and back to the external cooling source 118. This flow can be controlled, for example, by valves 122, 124. Although the valve 122 is illustrated in FIG. 1 as a manual valve, and the valve 124 is illustrated as an electric solenoid, other types of valves can be used in such a system.

Another portion of the coolant 120 flows through a first heat exchanger 126 in the dehumidifier 12. Upon exiting the heat exchanger 126 it flows back to the external cooling source 118, the flow of which is controlled by an electric solenoid valve 128. In addition to the heat exchanger 126, and one of the refrigeration system heat exchangers 22, the dehumidifier also includes a dehumidifier desiccant heat exchanger 130. The heat exchanger 130 receives the desiccant 42 from the dehumidifier sump 44 as it is pumped by the pump 46. One or both of the refrigeration system or the external cooling source 118 can provide cooling to the desiccant 42 through the dehumidifier desiccant heat exchanger 130. For example, when the solenoid valve 128 is open, some of the coolant 120 flows through the heat exchanger 126, where it receives heat from a second coolant 132. The coolant 132 then flows through one of the refrigeration system heat exchangers 22 where it is further cooled by the refrigerant 28. Thus, when the coolant 132 reaches the heat exchanger 130, it has been cooled by both cooling sources and can remove a greater quantity of heat from the desiccant 42 in the dehumidifier 12. To the extent that the external cooling source cannot provide adequate cooling, or is not required, the solenoid valve 128 can be closed so that the coolant 132 is cooled only by the refrigerant 28 in the heat exchanger 22. To the extent that the desiccant 42 does not require cooling, the coolant pump 134 can be shut off.

Similar to the control of desiccant heating in the regenerator 14, control of desiccant cooling in the dehumidifier 12 can be controlled through a control system that receives multiple sensor inputs indicating various temperatures, pressures, and humidities and determines the appropriate source and quantity for cooling the desiccant 42 in the dehumidifier 12. Additional control and conditioning of the airflow 114 leaving the dehumidifier 12 can be obtained by using the heat exchanger 24, which is another evaporator within the refrigeration system. In this way, the temperature and humidity of the airflow 114 can be effectively and efficiently controlled using the air conditioning system 10 to provide a desired output.

Figure 3:
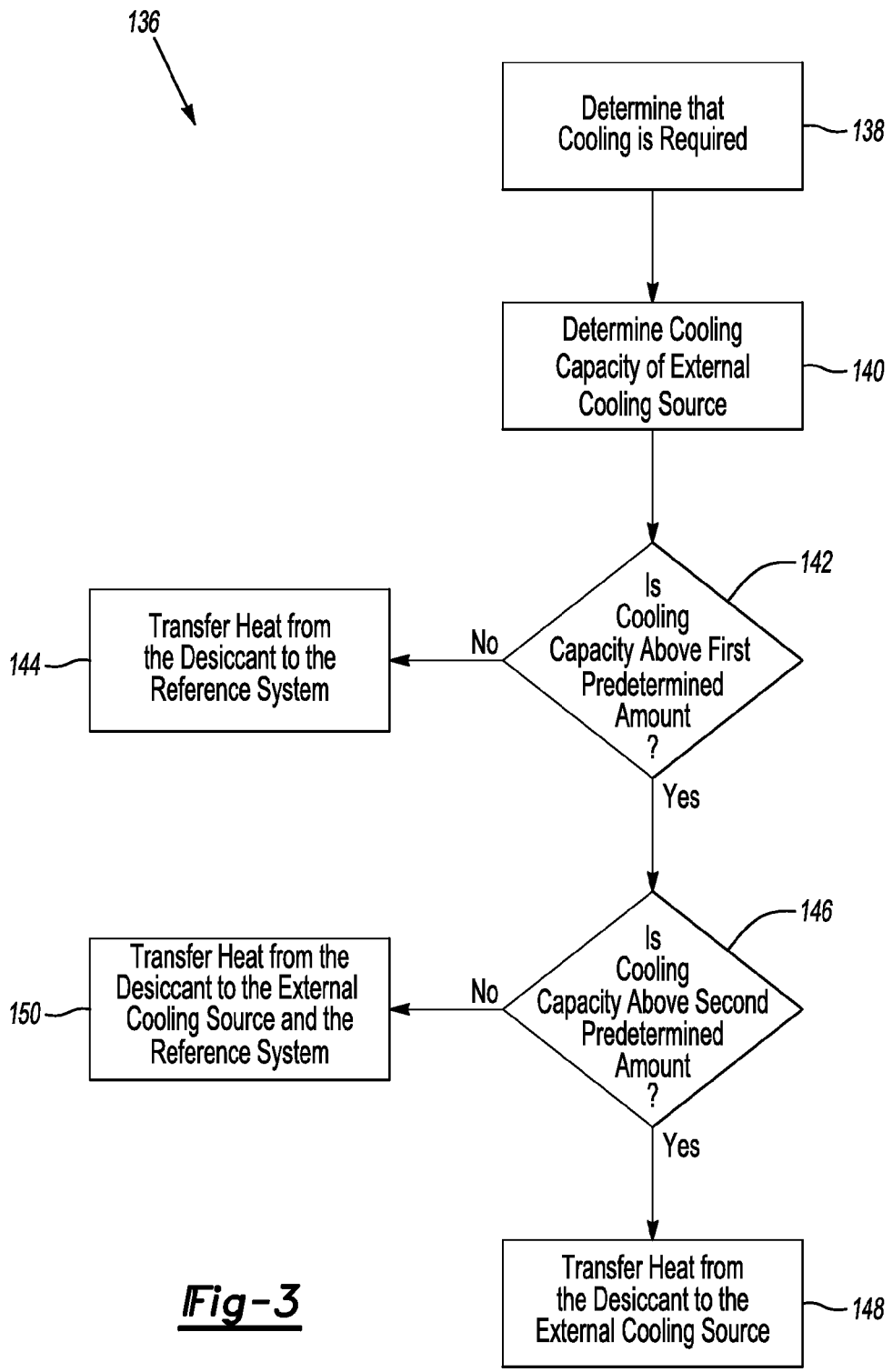
FIG. 3 is a high-level flow chart illustrating embodiments of a control strategy for controlling the air conditioning system shown in FIG. 1.

FIG. 3 shows a flow chart 136, which illustrates a method of controlling the cooling of the desiccant 42 in the dehumidifier 12 as illustrated in FIG. 1. At the first step 138, it is determined that cooling is required. This may be determined, for example, by measuring the conditions of the supply air—such as temperature and/or humidity—and comparing these conditions to the set point. The set point is the value or values of desired conditions as chosen by a user of the system 10, and may include, for example, one or both of a desired temperature and humidity. Once this determination is made, the method moves to step 140, where the cooling capacity of the external cooling source 118 is determined. Just like the heating capacity of a heating source as discussed above, there may be any number of ways to determine the cooling capacity of the external cooling source 88, such as determining a temperature and volume of a reservoir of liquid. In general, a control strategy is then implemented to determine whether to provide cooling from the external source 118 to the desiccant 42 in the dehumidifier 12, and if so, whether some or all of the cooling will come from the external source 118.

If it is determined that the cooling capacity of is great enough, at least some of the cooling provided to the desiccant 42 in the dehumidifier 12 will come from the external cooling source 118. A high-level diagram of such a control system is illustrated in the flow chart 136, where a determination is made at decision block 142 as to whether the determined cooling capacity is above a first predetermined amount. If it is not, cooling is provided by the refrigeration system, for example, by operating pump 134 and by closing the valve 128 to shut off the flow of the coolant 120 to and from the heat exchanger 126—see step 144. In such a case, all of the heat transferred from the desiccant 42 in the heat exchanger 130 will be transferred to the refrigerant 28 of the refrigeration system.

If it is found that the cooling capacity of the external cooling source 118 is above the first predetermined amount, then at least some of the cooling provided to the desiccant 42 in the heat exchanger 130 may come from the external cooling source 118. Whether only a portion of the cooling provided to the desiccant 42 comes from the external cooling source 118, or whether all of it is from the external cooling source 118 depends on how far above the first predetermined amount the cooling capacity of the external cooling source 118 is. For example, it is determined at decision block 146 whether the cooling capacity of the external cooling source 118 is above a second predetermined amount, which is above the first predetermined amount. If the answer is "yes", then all of the cooling provided to the desiccant 42 in the heat exchanger 130 will come from the external cooling source 118, and cooling provided from the refrigeration system through heat exchanger 22 is prohibited. This may be accomplished, for example, by closing the valve 38—see step 148.

If the cooling capacity of the external cooling source 118 is between the first and second predetermined amounts, then cooling will be provided to the desiccant 42 in the heat exchanger 130 from both the external cooling source 118, and the refrigeration system—see step 150. In at least some embodiments of the invention, the external cooling source 118 will be used to the full extent of its capacity to provide as much cooling as possible; the refrigeration system will be used to provide only that portion of cooling not available from the external cooling source 118. This reduces the reliance on the refrigeration system, which will generally result in less energy being used and a lower cost of operation.

Similar to the control strategy used on the regeneration side, the control strategy illustrated in FIG. 3 controls the flow of the refrigerant 28 through the heat exchanger 22 and the flow of the coolant 120 through the heat exchanger 126 to maximize the amount of heat transferred from the coolant 132 to the coolant 120, and to minimize the amount of heat transferred from the coolant 132 to the refrigerant 28. As with the heating capacities described above, the actual values of the first and second predetermined amounts used to evaluate how cooling will be provided to the desiccant 42 may depend on a number of factors, including the temperature of the desiccant 42 on the process side, and the state of the conditioned air 114 as it leaves the dehumidifier 12.

While exemplary embodiments are described above, it is not intended that these embodiments describe all possible forms of the invention. Rather, the words used in the specification are words of description rather than limitation, and various changes may be made without departing from the spirit and scope of the invention. Additionally, the features of various implementing embodiments may be combined to form further embodiments of the invention.

What is claimed is:

1. A system for conditioning air, comprising:
   a dehumidifier into which a first airflow is introduced and contacted with a liquid desiccant to transfer water from the first airflow to the liquid desiccant;
   a regenerator into which a second airflow is introduced and contacted with the liquid desiccant to transfer water from the liquid desiccant to the second airflow;
   a refrigeration system that includes a plurality of heat exchangers, a refrigerant, and a compressor;
   a regeneration desiccant heat exchanger configured to:
      selectively receive heat from the refrigeration system,
      selectively receive heat from an external heat source, and
      receive the liquid desiccant from the regenerator to transfer heat from at least one of the refrigeration system or the external heat source to the liquid desiccant prior to the second airflow contacting the liquid desiccant;
   a dehumidifier desiccant heat exchanger configured to:
      receive the liquid desiccant from the dehumidifier to selectively transfer heat to at least one of the refrigeration system or an external cooling source prior to the first airflow contacting the liquid desiccant;
   a first coolant cooled by the external cooling source;
   a second coolant in contact with the dehumidifier desiccant heat exchanger; and
   a first heat exchanger configured to selectively receive the first and second coolants such that heat is transferred from the second coolant to the first coolant.

2. The system of claim 1, further comprising a first heat transfer fluid selectively in contact with a first of the refrigeration system heat exchangers for receiving heat from the refrigerant, and selectively in contact with the regeneration desiccant heat exchanger for transferring heat to the liquid desiccant; and
   a second heat transfer fluid configured to receive heat from the external heat source, and selectively in contact with the regeneration desiccant heat exchanger to transfer heat to the liquid desiccant.

3. The system of claim 2, further comprising a control system configured to control the second heat transfer fluid to provide a maximum amount of heat to the liquid desiccant from the external heat source, and to control the first heat transfer fluid to provide a minimum amount of heat to the liquid desiccant from the refrigerant.

4. The system of claim 2, wherein the regeneration desiccant heat exchanger includes an inlet and an outlet, the first and second heat transfer fluids entering the regeneration desiccant heat exchanger through the inlet to combine with each other when the regeneration desiccant heat exchanger receives heat from both heat transfer fluids.

5. The system of claim 4, wherein the flow of the combined heat transfer fluid is split after it exits the regeneration desiccant heat exchanger such that a portion of the combined heat transfer fluid returns to the first refrigeration system heat exchanger and a portion returns to the external heat source.

6. The system of claim 2, wherein a second of the refrigeration system heat exchangers is configured to receive the first coolant from the external cooling source and to transfer heat from the refrigerant to the first coolant.

7. The system of claim 6, wherein the first refrigeration system heat exchanger is disposed relative to the refrigerant downstream of the compressor and upstream of the second refrigeration system heat exchanger such the temperature of the refrigerant entering the first refrigeration system heat exchanger is higher than the temperature of the refrigerant entering the second refrigeration system heat exchanger.

8. The system of claim 6, wherein the refrigeration system further includes a third heat exchanger configured to receive the refrigerant downstream from the first refrigeration system heat exchanger and upstream from the second refrigeration system heat exchanger, the third refrigeration system heat exchanger being configured to contact and transfer heat to the second airflow prior to the second airflow contacting the liquid desiccant.

9. The system of claim 1, wherein one of the refrigeration system heat exchangers is configured to receive the refrigerant and the second coolant for transferring heat from the second coolant to the refrigerant.

10. The system of claim 9, wherein the one refrigeration system heat exchanger is downstream from the first heat exchanger and upstream from the dehumidifier desiccant heat exchanger relative to the second coolant.

11. The system of claim 10, wherein a second of the refrigeration system heat exchangers is configured to receive the first coolant and to transfer heat from the refrigerant to the first coolant.

12. The system of claim 11, wherein the flow of the first coolant can be selectively split between one or both of the first heat exchanger and the second refrigeration system heat exchanger.

13. The system of claim 12, wherein the refrigeration system further includes a third heat exchanger configured to receive the refrigerant downstream from the second refrigeration system heat exchanger and upstream from the compressor, the third refrigeration system heat exchanger being configured to contact and remove heat from the first airflow after the first airflow contacts the liquid desiccant.

14. A system for conditioning air, comprising:
- a dehumidifier into which a first airflow is introduced and contacted with a liquid desiccant to transfer water from the first airflow to the liquid desiccant;
- a regenerator into which a second airflow is introduced and contacted with the liquid desiccant to transfer water from the liquid desiccant to the second airflow;
- a refrigeration system that includes a plurality of heat exchangers, a refrigerant, and a compressor;
- a dehumidifier desiccant heat exchanger configured to:
  - selectively transfer heat from the desiccant in the dehumidifier to the refrigeration system prior to the first airflow contacting the liquid desiccant, and
  - selectively transfer heat from the desiccant in the dehumidifier to an external cooling source prior to the first airflow contacting the liquid desiccant;
- a first coolant cooled by the external cooling source;
- a second coolant in contact with the dehumidifier desiccant heat exchanger; and
- a first heat exchanger configured to selectively receive the first and second coolants such that heat is transferred from the second coolant to the first coolant.

15. The system of claim 14, wherein one of the refrigeration system heat exchangers is configured to receive the refrigerant and the second coolant for transferring heat from the second coolant to the refrigerant.

16. The system of claim 15, further comprising a control system configured to control the first coolant and the refrigerant to provide a maximum amount of heat transfer from the second coolant to the first coolant, and a minimum amount of heat transfer from the second coolant to the refrigerant.

17. The system of claim 16, wherein the one refrigeration system heat exchanger is downstream from the first heat exchanger and upstream from the dehumidifier desiccant heat exchanger relative to the second coolant.

18. The system of claim 16, wherein a second of the refrigeration system heat exchangers is configured to receive the first coolant and to transfer heat from the refrigerant to the first coolant.

19. The system of claim 18, wherein the flow of the first coolant can be selectively split between one or both of the first heat exchanger and the second refrigeration system heat exchanger.

20. The system of claim 19, wherein the refrigeration system further includes a third heat exchanger configured to receive the refrigerant downstream from the second refrigeration system heat exchanger and upstream from the compressor, the third refrigeration system heat exchanger being configured to contact and remove heat from the first airflow after the first airflow contacts the liquid desiccant.

* * * * *